United States Patent
Bodecker

[11] Patent Number: 6,142,553
[45] Date of Patent: Nov. 7, 2000

[54] TARP ROLL SAFETY SYSTEM FOR TRAILERS

[76] Inventor: Thomas F. Bodecker, Box 737, Marysville, British Columbia, Canada, V0B 1Z0

[21] Appl. No.: 09/060,353

[22] Filed: Apr. 15, 1998

Related U.S. Application Data

[60] Provisional application No. 60/044,647, Apr. 18, 1997.

[30] Foreign Application Priority Data

Apr. 16, 1997 [CA] Canada .................................. 2202802

[51] Int. Cl.⁷ ........................................................ B60P 7/04
[52] U.S. Cl. ................ 296/98; 296/100.01; 296/100.11; 296/100.15; 135/903; 160/243
[58] Field of Search ................................ 296/98, 100.01, 296/100.11, 100.15; 135/903; 105/377.02; 160/238, 243, 290, 309, 319, 320

[56] References Cited

U.S. PATENT DOCUMENTS

| | | | |
|---|---|---|---|
| 808,963 | 1/1906 | Winberg | 160/309 |
| 1,712,455 | 5/1929 | Connolly | 160/309 |
| 3,819,082 | 6/1974 | Rosenvold | 220/24 |
| 4,172,614 | 10/1979 | Guido, Jr. | 296/100 |
| 4,302,043 | 11/1981 | Dimmer et al. | 296/98 |
| 4,505,512 | 3/1985 | Schmeichel et al. | 296/98 |
| 4,516,802 | 5/1985 | Compton | 296/98 |
| 4,691,957 | 9/1987 | Ellingson | 296/98 |
| 4,858,395 | 8/1989 | McQuirk | 52/3 |
| 5,050,923 | 9/1991 | Petelka | 296/98 |
| 5,125,713 | 6/1992 | Willingham et al. | 296/98 |
| 5,180,203 | 1/1993 | Goudy | 296/98 |
| 5,181,725 | 1/1993 | Leras et al. | 273/402 |
| 5,328,228 | 7/1994 | Klassen | 296/98 |
| 5,482,347 | 1/1996 | Clarys et al. | 296/98 |
| 5,549,347 | 8/1996 | Anderson | 296/98 |
| 5,697,663 | 12/1997 | Chenowth | 296/98 |
| 5,697,664 | 12/1997 | Chenowth | 296/98 |
| 5,743,700 | 4/1998 | Wood, Jr. et al. | 414/498 |

*Primary Examiner*—D. Glenn Dayoan
*Assistant Examiner*—Paul Chenevert
*Attorney, Agent, or Firm*—Antony C. Edwards

[57] ABSTRACT

A flexible cover is rolled from a second longitudinal edge of a trailer opening, over spanning members, and any load held in the trailer, to an opposite first longitudinal edge. A harness, which may be a "V"-shaped pair of ropes, is mounted to a mid-point along a longitudinal free edge of the flexible cover. The opposite edge of the flexible cover is fixed to the first longitudinal edge of the trailer. The harness is sized so as to be positionable laterally from the second longitudinal edge to the first longitudinal edge of the flexible cover, across, so as to lay on and extend laterally from, an upper surface of the flexible cover when the flexible cover is unrolled so as to be deployed across the trailer opening. When the flexible cover is rolled-up the harness is correspondingly rolled-up in contact with the upper surface of the flexible cover in the storage position. An elongate flexible lead, such as a throw line is releasably securable to the harness, and is sufficiently long so as to extend across the opening of the trailer to the ground on the side of the trailer when thrown thereover from a first side of the trailer corresponding to the first longitudinal edge of the trailer opening. A furling crank is provided for selectively rolling the flexible cover from the deployed position into the storage position.

6 Claims, 7 Drawing Sheets

TARP ROLL SAFETY SYSTEM FOR TRAILERS

CROSS REFERENCE TO RELATED APPLICATION

This application claims priority from U.S. Provisional Patent Application No. 60/044,647 filed Apr. 18, 1997 and Canadian Patent Application No. 2,202,802 filed Apr. 16, 1997 titled TARP ROLL SAFETY SYSTEM FOR TRAILERS.

FIELD OF THE INVENTION

This invention relates to the field of covers for trailers and in particular to a system for rolling and unrolling tarp covers used to cover chip trailers and the like for transport by means of a tractor in a tractor trailer combination, wherein an operator can roll and unroll the tarp cover from the ground.

BACKGROUND OF THE INVENTION

Conventional open-top trailers such as chip trailers used to convey wood chips, are covered by flexible sheets such as tarps. In the prior art, a platform is typically provided at one end of the trailer so that an operator may climb up onto the platform to manually roll and unroll the tarp so as to uncover and cover, respectively, the trailer opening. In practice, however, an operator quite often is required to climb up onto the loaded trailer to assist the rolling and unrolling the tarp cover. This has resulted in accidents where, for example, in the winter time and in the dark, an operator who is expected to cover and uncover the load by himself, will slip and fall from the top of the trailer. The fall is a significant distance, often in resulting in injury.

Consequently, it is desirable, and an object of the present invention to provide, a system which relieves the practice requirement of an operator having to climb up onto, firstly, a platform elevated above the ground, and secondly, the load itself to assist rolling and unrolling the tarp cover. It is an object of the present invention to provide such a system where an operator can more safely roll and unroll the tarp cover from the ground.

In the prior art, applicant is aware of U.S. Pat. No. 5,549,347 which issued to Anderson on Aug. 27, 1996, for An All Weather Mechanically Reciprocatable Roll Tarp Cover Apparatus. Anderson teaches a mechanically reciprocatable roll top cover for covering and uncovering the open top side of receptacles such as trailers. The panel is divided into two sloping panels by a truss structure. Two primary operating drive devices are provided which include an uncovering drive device for removing the cover and a covering drive device for replacing the cover. The cover has one edge fixed at one side wall of the trailer receptacle. The opposing edge of the cover is free to travel between the opposing side walls of the trailer receptacle. The uncovering drive device includes a shaft which is rotated toward the cover's fixed edge to wind the cover onto the shaft. The covering drive device is a shaft rotatably mounted to the opposite side wall of the trailer. A plurality of flexible straps and a strap winding system are mounted to the shaft. The straps interconnect the shaft to the free edge of the cover so that when the shaft is rotated, the straps draw the cover over the truss structure. The straps are wound onto spools mounted on the shaft.

In the tarp cover unrolling system of the present invention, there is no requirement for a rotatable shaft having spools mounted thereon cooperating with straps attached to the cover so as to draw the cover across the receptacle opening. Rather, the system of the present invention incorporates a harness which is rolled up along with the tarp when the tarp is rolled. The harness is attachable to a length of line which may be pulled by the operator from the ground so as to unroll the tarp and thereby cover the trailer opening.

SUMMARY OF THE INVENTION

The trailer cover deployment and storage device of the present invention includes, without limiting, means for selectively deploying a flexible cover over an upwardly open trailer opening, where a first longitudinal edge of the flexible cover is mounted along a first longitudinal edge of an upper, generally planar opening of the trailer.

The trailer includes at least one lateral spanning member extending from the first longitudinal edge of the generally planar opening to an opposed second longitudinal edge of the planar opening for supporting thereon the flexible cover when deployed and during deployment.

The flexible cover is sized so that an opposed second longitudinal edge of the flexible cover opposed to the first longitudinal edge of the flexible cover overlaps the second longitudinal edge of the planar opening when the flexible cover is deployed.

The second longitudinal edge of the flexible cover has a rigid member mounted therealong. The flexible cover is retractably deployable from a furled or rolled-up storage position along the first longitudinal edge of the planar opening. The flexible cover is furled or rolled about a longitudinal axis of the rigid member. The cover is rolled from the second longitudinal edge, over the spanning member or members, and any load held in the trailer, to the first longitudinal edge. A harness, which may be a "V"-shaped pair of ropes or a like flexible member has opposed first and second ends. The spaced apart ends of the "V" may be thought of as the second end of the flexible member. The second end of the flexible member is mounted to a mid-point along the second longitudinal edge of the flexible cover. The harness is sized so as to be positionable laterally from the second longitudinal edge to the first longitudinal edge of the flexible cover, across, so as to lay on and extend laterally from, an upper surface of the flexible cover when the flexible cover is unfurled or unrolled so as to be deployed across the planar opening. When the flexible cover is furled or rolled-up the harness is correspondingly furled or rolled-up in contact with the upper surface of the flexible cover in the storage position. An elongate flexible lead, such as a polyester throw line is releasably securable at the first end of the harness. The free end of the throw line and the free end (i.e. the first end) of the harness may have throwing weights mounted thereon. The throw line, when releasably secured to the harness, is sufficiently long so as to extend across the planar opening of the trailer to the ground on the side of the trailer when thrown thereover from a first side of the trailer corresponding to the first longitudinal edge of the planar opening. Furling means is provided for selectively rolling the flexible cover from the deployed position into the storage position.

Advantageously the harness is non-resilient. The harness may include a plurality of flexible straps, ropes or the like spaced apart in a plurality of "V"s along the second longitudinal edge of the flexible cover.

In one aspect of the present invention, the furling means is an elongate member such as a pole mounted along the second longitudinal edge of the flexible cover, releasably couplable by releasable coupling means at one end thereof to a first end of an elongate crank, wherein the first end of the elongate crank is flared, such as conically flared, to assist disentangling tie-downs which may become wrapped around the elongate crank as the crank is rotated to furl the flexible cover. In a second aspect, the releasable coupling means is a universal joint coupling, preferably having a resilient outer coating.

In a further aspect of the invention, for use where a load of chips or the like is piled into the trailer so as to be heaped above the level of the uppermost edges of the trailer, a vertically telescoping pole or the like having an elongate generally horizontal roller mounted on the top of the pole may be provided to assist unfurling the cover over the heaped load. When it is desired to unfurl the cover over the heaped load, the throw line or lead line is positioned over the roller and the pole is telescoped vertically upwardly into an elevated position wherein the line and harness, once tensioned, approximate a generally straight line, over the heaped load, between the furled cover and the roller. The line may then be drawn over the roller to unfurl the cover. As the cover is unfurled over the apex of the heaped load, the harness will fall off the roller as the spread of the "V" clears the ends of the roller. The pole may then be lowered and secured to the side of the trailer.

DETAILED DESCRIPTION OF THE PREFERRED EMBODIMENT

Figure 1:
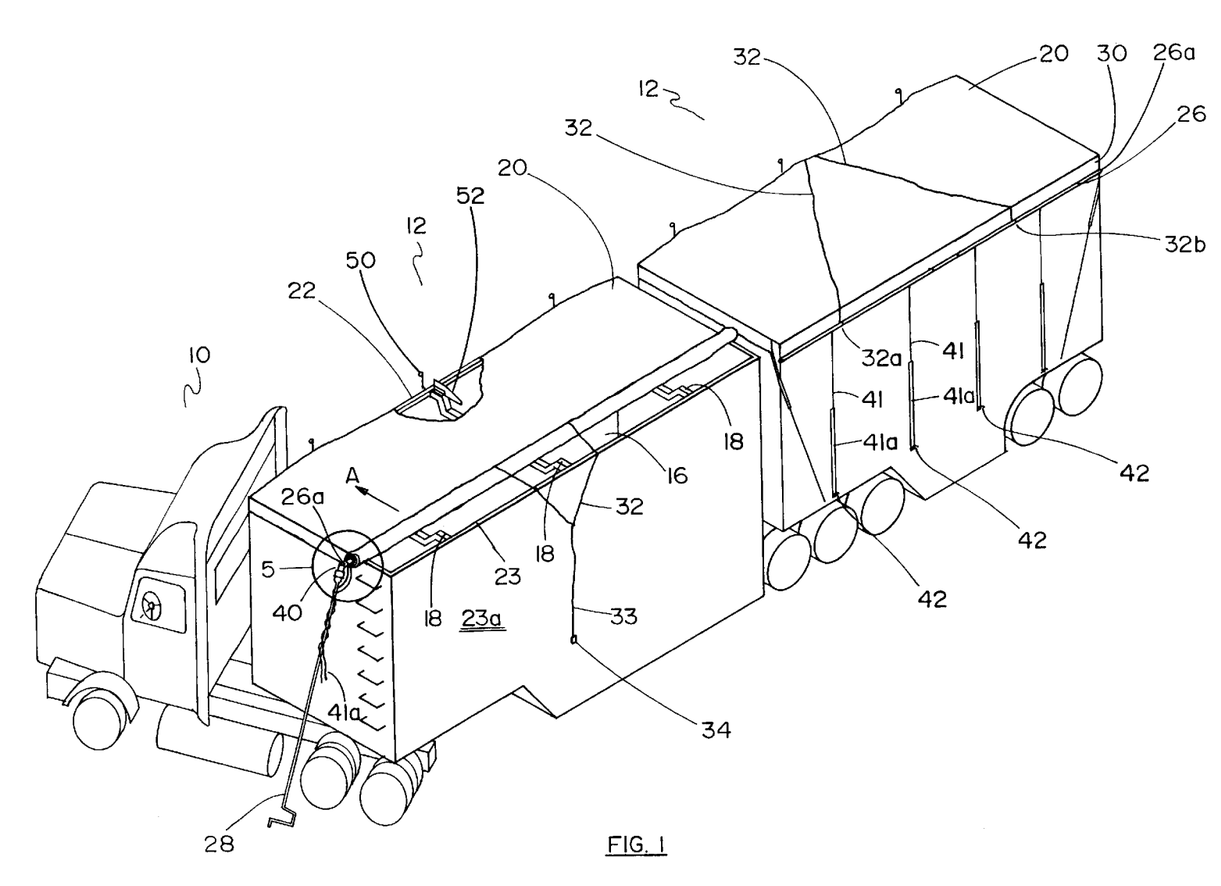
FIG. 1 is, in perspective view, a tractor and B-train incorporating the tarp roll safety system of the present invention.

Sawmills produce large quantities of wood chips. Conventionally, wood chips are now transported from sawmills by tractor trailers, such as seen in FIG. 1, where a conventional tractor 10 pulls B-train chip vans or trailers 12, and in particular two such trailers aligned longitudinally, one behind the other. Such chip trailers 12 are designed to carry large volumes of wood chips 14. Because of the large volume of wood chips that may be transported at one time, the trailers are necessarily also large, and it is therein that the problem arises, to which the present invention is directed.

Figure 2:
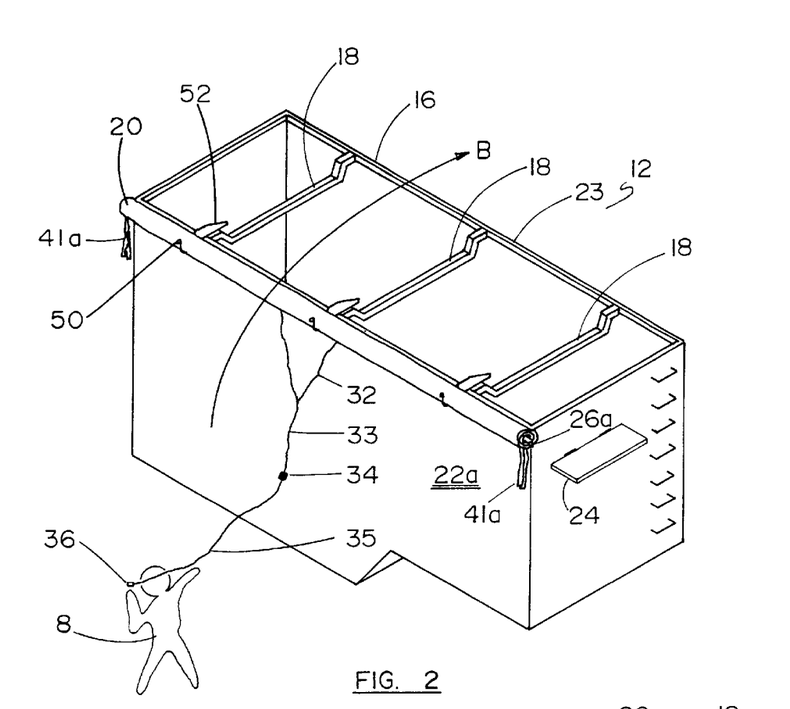
FIG. 2 is, in perspective view, a trailer with the tarp cover rolled up.

As will be readily understood, loads of wood chips in open trailers must be covered during transport. Conventional wood chip trailers are basically open bins which may be filled from above. The openings 16 of the bins are generally horizontal and planar and supported by lateral cross-members 18. These trailers are typically equipped with tarpaulin covers 20. These "tarp" covers 20 are typically stored by rolling in a lateral direction "A" across the top of the trailer cross-members 18, so as to result in a longitudinally extending rolled tarp 20, such as seen in FIG. 2, extending the length of the trailer 12 along one side edge 22 of the trailer opening 16. To roll and unroll tarp 20, conventionally an operator has to either stand on a raised platform 24, which conventionally may be folded down from a folded up storage position, so as to operate a hand crank (not shown) connected to a longitudinally extending pole 26 shown as exposed end 26a in FIGS. 1–3 and 5, and better seen in FIG. 4. Platform 24 would conventionally be mounted so as to fold down in the space between front and rear trailers 12, rather than at the front of the front trailer as shown in FIG. 2 for illustration purposes. Pole 26 is attached to the free edge 30 of tarp 20. Conventionally the operator may have to climb up onto wood chips 14 to manually assist the rolling and unrolling of tarp 20. These activities have proven to be hazardous, especially in winter, where operators, who typically are on their own, slip and fall from the top of trailers 12, thereby causing injury.

In the present invention rope harness 32 is used to assist unrolling or unfurling tarp 20 so as to cover a load of chips 14 without the need for the operator to climb up onto the trailer 12. For sake of certainty, the two sides of the trailer will be referred to in reference to a trailer attached to a truck where one side of the trailer would then correspond to the driver's side of the truck, and the opposed side of the trailer would correspond to the passenger side of the truck. Thus, by convention, although clearly not so as to be limiting, a rolled up tarp 20 is attached as seen in FIG. 2 along the passenger side 22a corresponding to side edge 22 of the trailer opening 16.

The rolled up tarp 20 is free to be unfurled over the trailer opening 16, typically by being unrolled over a load of wood chips 14 so that free end 30 of tarp 20 and pole 26 is draped over the driver's side 23a, and in particular side edge 23, of the trailer opening 16.

Figure 5:
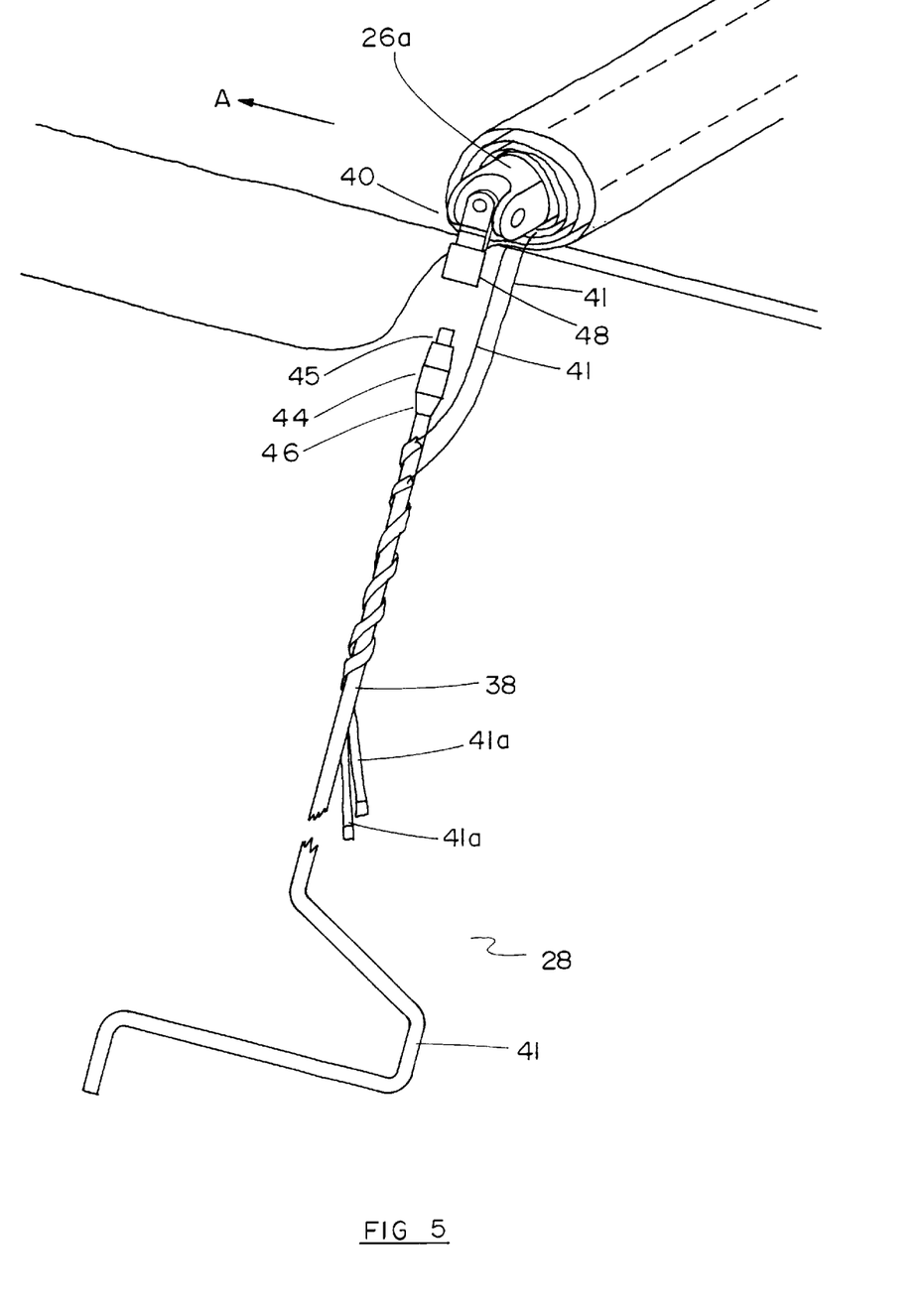
FIG. 5 is an enlarged partial view from FIG. 1.

Crank 28 may be releasably coupled to end 26a of pole 26, as better seen in FIG. 5.

The two ends 32a and 32b of the V-shaped harness 32, are attached to pole 26 in the free edge 30 of the tarp 20. Harness 32 may have a short lead line extension 33 between the vertex of the "V" and a weighted coupling 34. A throw line 35 releasably coupled to lead line 33, may be weighted at its free end by weight 36 to facilitate throwing of throw line 35 over opening 16 of the covered trailer 12. Weighted coupling 34 may be a threaded coupling or the like.

With the tarp 20 unfurled so as to cover over trailer opening 16, harness 32 is positioned over the top surface of unfurled tarp 20 as seen on the rear trailer 12 in FIG. 1, so that harness 32 lays flat in its natural "V"-shape over tarp 20. To accomplish this, once tarp 20 is unfurled as described below, weight 36, throw line 35 and lead line 33 are thrown over trailer 12 so as to lay harness 32 over tarp 20. The vertex of harness 32 or lead line 33 may then be secured to the side 22a of trailer 12, and throw line 35 detached for storage.

Advantageously, lead line 33 may be polyester rope, and is not so long as to drag on the ground. The weighted coupling 34 may weigh approximately 4 ounces. Throw line 35 may be a 15 foot length of polyester rope having at its end a 12 ounce throw weight 36.

Tarp 20 may be rolled in direction A by use of a crank 28 releasably coupled to end 26a of pole 26, for example, by means of an elongate crank shaft 38 (shown shortened in FIG. 5) releasably couplable to a universal joint coupling 40. Advantageously, crank shaft 38 is sufficiently long so that the crank 28 may be turned from the ground. Further advantageously a double offset crank handle 41 is mounted to the ground end of crank shaft 38 to assist in rotating the shaft. As the tarp 20 is rolled, the harness 32 is rolled into tarp 20, leaving lead line 33 hanging from the rolled up tarp 20 on side 22a as seen in FIG. 2.

Rolled up tarp 20 is held in place between uprights 50, which may be spring loaded or otherwise resilient or somewhat flexible, and ramp members 52, which may also be somewhat non-rigid as, for example, of stiff rubberized material. Tarp 20 is furled up over ramp members 52 so as to drop into place between ramp members 52 and uprights 50. Ramp members 52 are of sufficiently low profile so that pulling on throw line 35 will urge rolled up tarp 20 over ramp members 52, but rolled up tarp 20 will be held in place as trailers 12 are driven underneath sawmill wood chip feed chutes.

Figure 3:
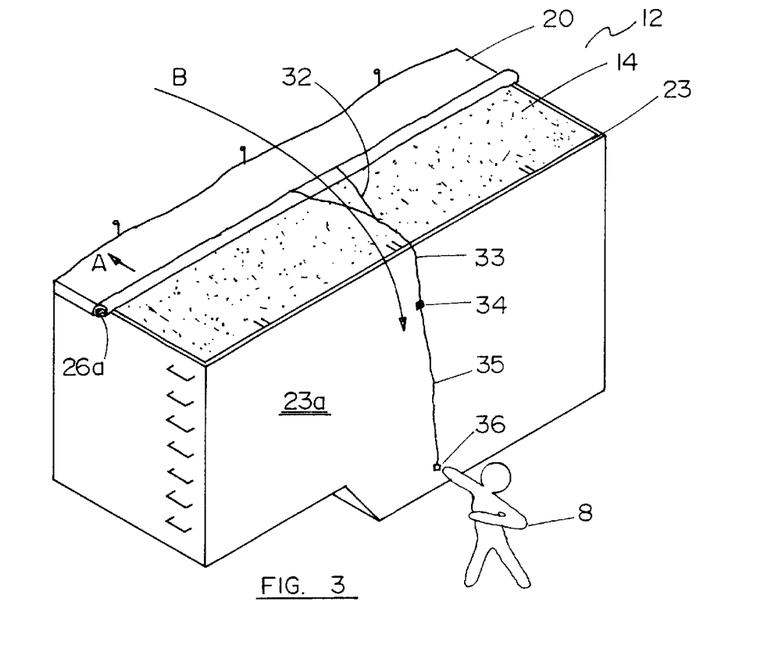
FIG. 3 is, in perspective view, a trailer with the tarp cover partly unrolled.
Figure 4:
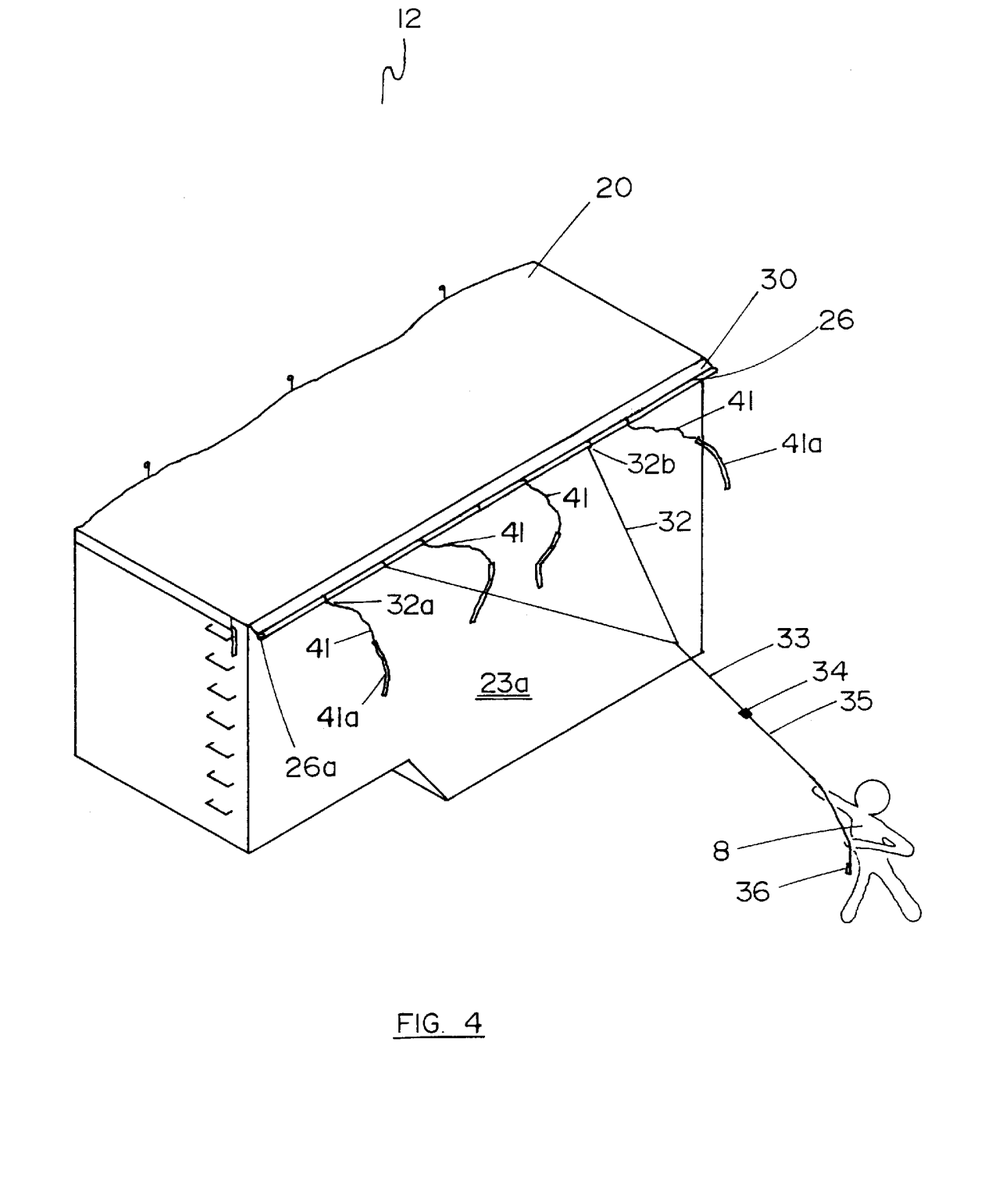
FIG. 4 is, in perspective view, a trailer with the tarp cover completely unrolled.
Figure 6:
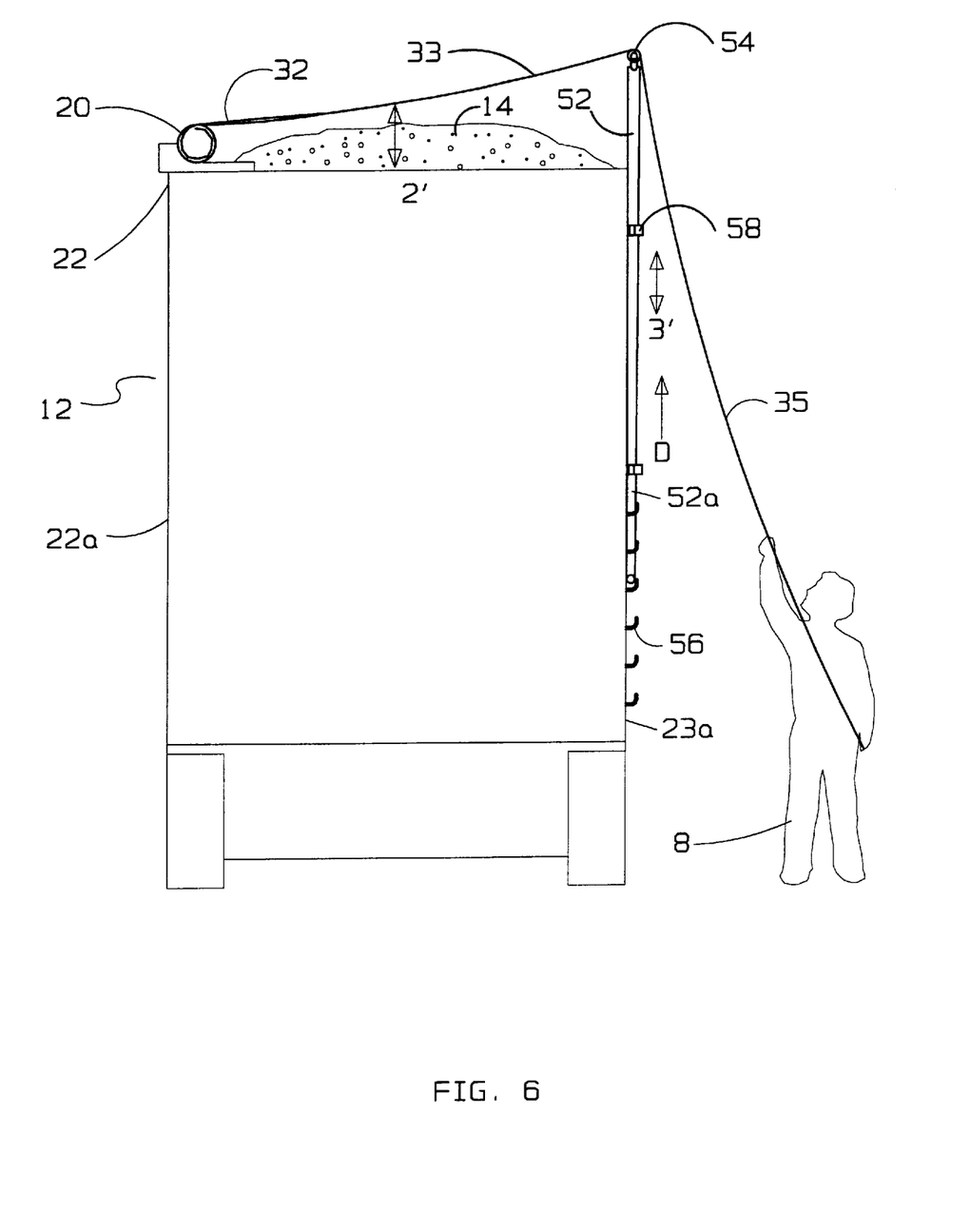
FIG. 6 is, in end elevation view, a trailer with an alternative embodiment of the present invention mounted thereon.
Figure 7:
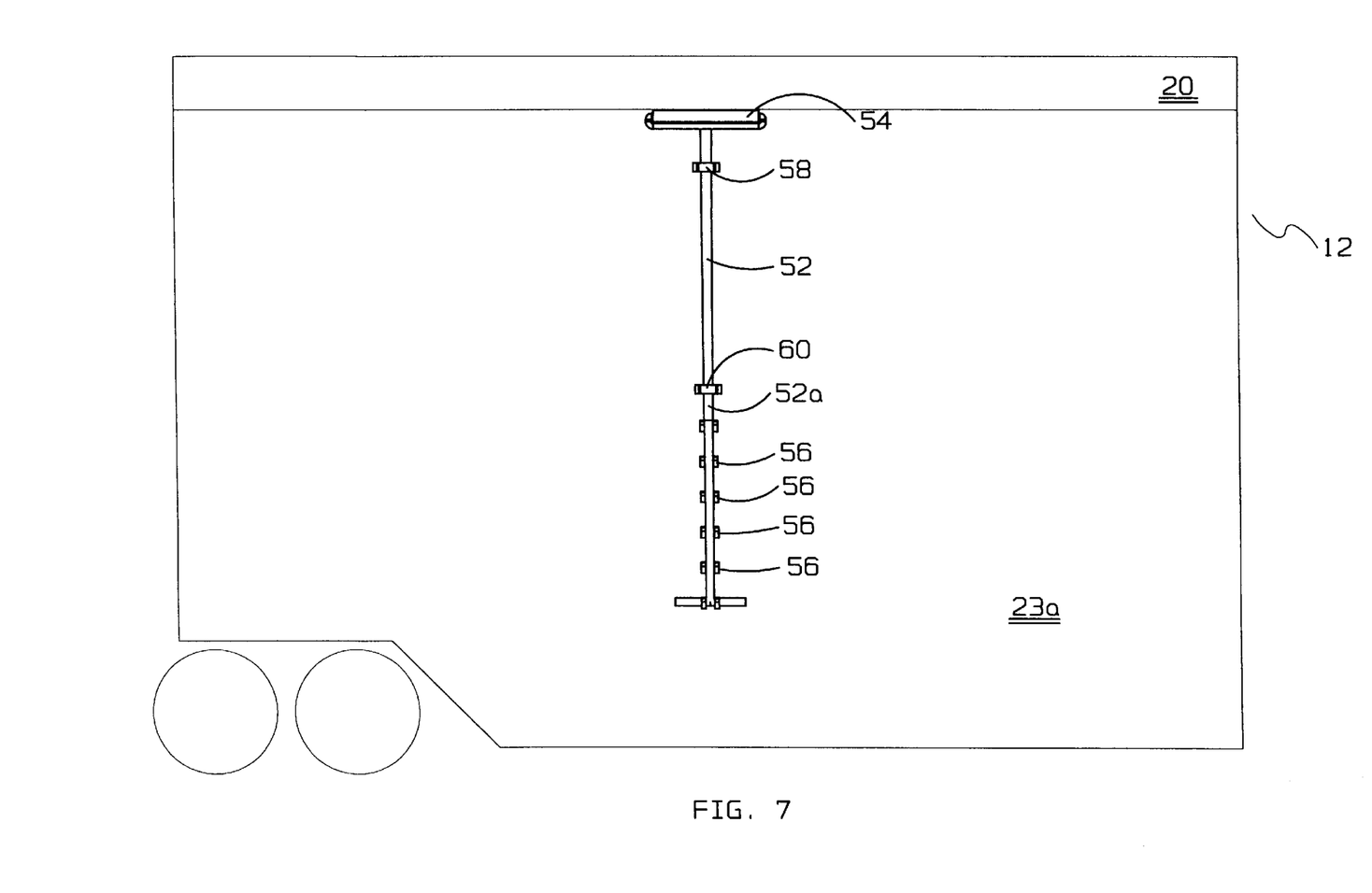
FIG. 7 is, in side elevation view, the embodiment of FIG. 6 with the roller lowered.
Figure 8:
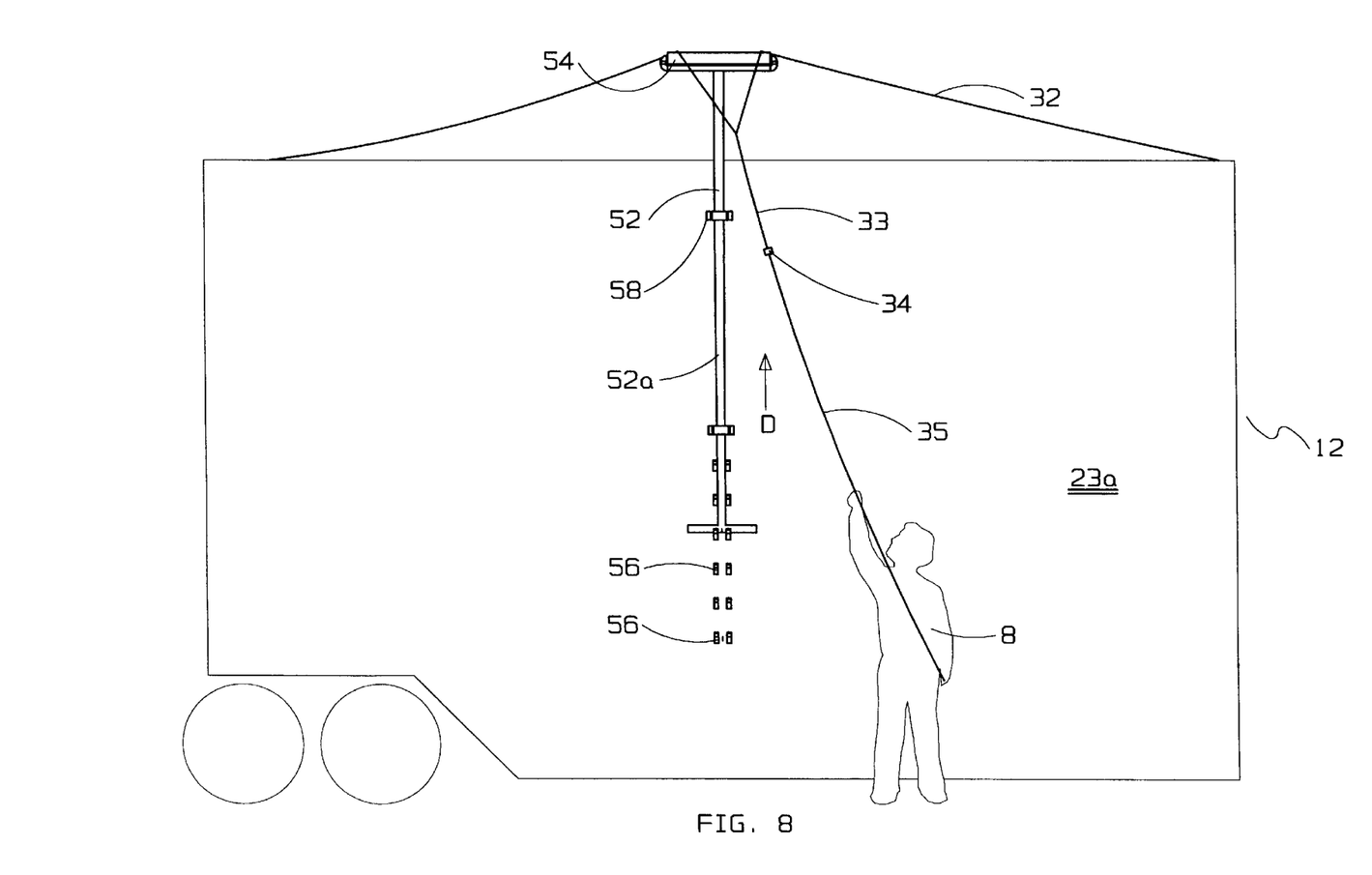
FIG. 8 is, in side elevation view, the embodiment of FIG. 6 with the roller elevated.

With harness 32 thus rolled into the rolled up tarp 20 along edge 22, unrolling tarp 20 so as to cover a load of wood chips 14 becomes a simple matter of throwing throw line 35 and lead line 33 in direction "B" over the top of a full trailer 12 where operator 8 has coupled throw line 35 to lead line 33, taken weight 36 on the weighted end of throw line 35 and thrown it over the top of the full trailer. In FIG. 4, operator 8 has walked around to the driver's side 23a of trailer 12, grasped throw line 35, and pulled on the line so as to draw harness 32 across the top of the trailer that is, across opening 16 such as seen in FIG. 3, at the same time thereby unfurling tarp 20 over the load of wood chips 14. As tarp 20 is completing its unfurling, as sharp tug on throw line 35 or lead line 33 by operator 8 causes tie down ropes 41 and bungy cords 41a to be thrown from the top surface of tarp 20 so as to hang down side 23a of trailer 12 for ease of retrieval. A hook or other elongate means may be employed to pull down tie down ropes and bungy cords that remain lying on the top surface of tarp 20. With tarp 20 unfurled, tarp 20 may be secured by tie down ropes 41 and bungy cords 41a, to tie down hooks 42 along the lower sides of trailer 12.

Where the load of chips 14 is piled into trailer 12 so as to be heaped above the level of the uppermost edges of the trailer, a vertically telescoping pole 52 as seen in FIGS. 6–8, having an elongate generally horizontal roller 54 mounted on the top of the pole, may be provided to assist unfurling tarp 20 over the heaped load of chips 14. When it is desired to unfurl tarp 20 over the heaped load, throw line 35 or lead line 33 is positioned so as to be drawn over roller 54 and the pole is telescoped vertically upwardly in direction D into an elevated position as seen in FIGS. 6 and 8. The elevation distance may be 3 feet to clear the harness over a 2 foot high heaped load. The line 33 and harness 32, once tensioned by operator 8, may approximate a generally straight line, over the heaped load, between the furled tarp 20 and the roller 54. The line 33 may then be drawn over roller 54 to unfurl tarp 20. As the tarp is unfurled over the apex of the heaped load of chips, harness 32 falls off roller 54 as the spread of the "V" clears the ends of the roller. Pole 52 may then be lowered into its storage position seen in FIG. 7 and secured to the side of the trailer by means of positioning locks 56 which may be upwarded opening hooks to receive therein the lowermost end of pole 52. Pole 52 is slidingly journalled in collar or sleeve 58, which is rigidly mounted to side 23a of the trailer. A lower narrower portion 52a of pole 52 may be pivoted at pivot 60 relative to the wider upper length of pole 52.

Thus, in a first aspect, when it is desired to unroll the tarp from the uncovered position to the covered position, the load covering method includes the use of a harness 32 attached to the free edge of a tarp in conjunction with a weighted line so as to cover a load of wood chips without an operator having to climb onto the load. The methodology is illustrated in sequence in FIGS. 2–4. In a second aspect of the methodology, it is important to note how tractor 10 is backed up so as to expose the front of the front trailer 12, thereby facilitating access by operator 8 to the front edge of the corresponding tarp 20. Without such access, the operator could not use crank 28 releasably coupled to coupling 40 mechanism to roll the tarp to the uncovered position.

As set out above, elongate crank 28 cooperates with pole 26 in the free edge 30 of tarp 20 by means of a universal joint coupling 40, so as to thereby assist in uncovering a load of wood chips 14 contained in a trailer 12 having an opening 16. In a further aspect, the end 44 of crank shaft 38 for releasable coupling with universal joint coupling 40 has a conically flared surface 46, or otherwise a smooth three dimensionally enlarged end for assisting in de-tangling lines 41 and bungy cords 41a which get wrapped around crank shaft 38 (as best seen in FIG. 5). Universal joint coupling 40 may have an outer resilient coating or collar 48 such as neoprene or the like, and end 44 may have a socket-like coupling 45 for releasable coupling with universal joint coupling 40. Crank 28 may be secured for storage and transport against side 23a of trailer 12.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. In a trailer coverable by a flexible cover, wherein a first longitudinal edge of said flexible cover is mounted along a first longitudinal edge of an upper, generally planar opening of said trailer, wherein said trailer includes at least one lateral spanning member extending from said first longitudinal edge of said planar opening to an opposed second longitudinal edge of said planar opening, wherein said flexible cover is sized so that an opposed second longitudinal edge of said flexible cover opposed to said first longitudinal edge of said flexible cover overlaps said second longitudinal edge of said planar opening when said flexible cover is deployed into a deployed position.

wherein said second longitudinal edge of said flexible cover has a rigid member mounted therealong, wherein said flexible cover is retractably deployable from a furled storage position along said first longitudinal edge of said planar opening, and wherein said flexible cover is furlable about a longitudinal axis so as to be rolled from said second longitudinal edge of said planar opening to said first longitudinal edge of said planar opening, a trailer cover deployment and storage device for selectively deploying said flexible cover, comprising an elongate flexible harness having opposed first and second ends, said harness mounted, at said second end, to said second longitudinal edge of said flexible cover, said harness sized so as to be positionable laterally from said second longitudinal edge of said flexible cover to said first longitudinal edge of said flexible cover, across, so as to lay on and extend laterally from, an upper surface of said flexible cover when said flexible cover is unfurled so as to be deployed across said planar opening into said deployed position, wherein when said flexible cover is furled, said harness is correspondingly furled in contact with said upper surface into said furled flexible cover in said storage position, an elongate flexible line, releasably securable at a first end thereof to said first end of said harness, a second end of said line, opposed to said first end of said line, having a throwing weight mounted thereon, said line when releasably secured to said harness being sufficiently long so as to extend at least across said planar opening when thrown thereover from a first side of the said trailer corresponding to said first longitudinal edge of said planar opening, and furling means for selectively rolling said flexible cover about said longitudinal axis from said deployed position into said storage position.

2. The device of claim 1 wherein said harness is non-resilient, said first end of said harness member is weighted, and said harness includes a plurality of elongate flexible members spaced apart along said second longitudinal edge of said flexible cover.

3. The device of claim 2 wherein said plurality of flexible members are attached to each other at ends thereof at said first end of said harness so that said harness is "V"-shaped.

4. The device of claim 1 wherein said furling means is an elongate rigid member mounted along said second longitudinal edge of said flexible cover, releasably couplable by a universal joint and releasable coupling means at one end thereof to a first end of an elongate crank, wherein said first end of said elongate crank is flared.

5. The device of claim 4 wherein said elongate crank is conically flared from a crank shaft to said releasable coupling.

6. The device of claim 4 wherein said releasable coupling has a resilient outer coating thereon.

\* \* \* \* \*